United States Patent
Silman

(10) Patent No.: US 8,311,881 B2
(45) Date of Patent: Nov. 13, 2012

(54) REWARDS FOR UNSEEN WEB SITE ACTIVITY

(75) Inventor: Robert Silman, London (GB)

(73) Assignee: Wonderlandaward.com Ltd, London (GB)

( * ) Notice: Subject to any disclaimer, the term of this patent is extended or adjusted under 35 U.S.C. 154(b) by 575 days.

(21) Appl. No.: 12/037,769

(22) Filed: Feb. 26, 2008

(65) Prior Publication Data

US 2009/0216617 A1 Aug. 27, 2009

(51) Int. Cl.
*G06F 17/30* (2006.01)
(52) U.S. Cl. .......... 705/10; 705/7; 705/26.1; 707/5; 704/233
(58) Field of Classification Search .......... 705/10, 705/14, 26; 707/5, 736, 754; 704/233
See application file for complete search history.

(56) References Cited

U.S. PATENT DOCUMENTS

| 7,143,089 | B2 | 11/2006 | Petras et al. | |
| 7,308,413 | B1* | 12/2007 | Tota et al. | 705/7.11 |
| 7,606,738 | B2* | 10/2009 | Storch et al. | 705/27.1 |
| 2003/0177059 | A1* | 9/2003 | Smorenburg et al. | 705/10 |
| 2004/0133463 | A1* | 7/2004 | Benderev | 705/10 |
| 2006/0224452 | A1* | 10/2006 | Ng | 705/14 |
| 2008/0195459 | A1* | 8/2008 | Stinski | 705/10 |

* cited by examiner

*Primary Examiner* — Vanel Frenel
(74) *Attorney, Agent, or Firm* — Kenyon & Kenyon LLP

(57) ABSTRACT

A method for maintaining a website by providing rewards for indirect unseen activities is disclosed. Individual reviewers are rewarded for reviewing and assigning rating scores to articles of media as a part of panel of reviewers consisting of more that one individual reviewer. The score from each individual reviewer does not directly determine whether or not the article of media is accepted and can be viewed by others, rather it is the score from the collective panel. Further, reviewers are rewarded for reviewing even if the media clip is rejected and cannot be viewed by others. Thus, reviewers are rewarded for their indirect unseen activities.

17 Claims, 3 Drawing Sheets

REWARDS FOR UNSEEN WEB SITE ACTIVITY

FIELD OF THE INVENTION

The present invention generally relates to providing rewards to members of a website, and more specifically to providing rewards to members for their unseen, indirect activity.

BACKGROUND OF THE INVENTION

In the past, rewards have been provided to users based on their direct activities on a website or on the Internet. Some websites have provided rewards to users based on the number of advertisements they view. For each advertisement viewed, a point or dollar amount is rewarded to the user viewing and clicking on the ads. Thus, through this direct activity an advertiser ensures that its ads are being used and the user gets rewarded for viewing and clicking through the ads.

Another direct activity that has been rewarded on the Internet has been the action of filling out and submitting surveys. A user is either emailed a survey or can access a survey through a website. For each survey completed and submitted, the user is rewarded with either a dollar amount, points that can be redeemed for goods, or entries into a contest or raffle.

SUMMARY OF THE INVENTION

According to one embodiment of the invention, a method for maintaining a website by providing rewards for indirect unseen activities is disclosed. The method includes forming a panel of reviewers that includes more than one individual reviewer. An article of media is provided to each of the individual reviewers of the panel of reviewers so that each individual reviewer can review and assign a rating score to the article of media. The rating scores from individual reviewers are compiled and a panel score based on the rating scores from each individual reviewer is determined. The panel score is compared against a predetermined minimum score to determine whether the article media will be accepted and viewable or rejected and not viewable. Each individual reviewer is rewarded with a reward for reviewing and assigning a rating score to the article of media regardless of how the individual reviewer's score compares to the scores of the other individual reviewers or the panel score, and regardless of whether the article media will be accepted and viewable or rejected and not viewable.

According to a further aspect of the invention, the website is capable of generating revenue and the value of the rewards are dependent on the profitability of the website.

As a yet further aspect, the rewards are distributed on a yearly basis based on the year end profitability of the website.

According to a still further aspect, the number of rewards rewarded to each individual reviewer increases as the number of articles of media each individual reviewer reviews and assigns a rating score increases.

Another aspect is that, the number of rewards rewarded to each individual reviewer increases as the length of the articles of media each individual reviewer reviews and assigns a rating score increases.

According to another aspect, the rewards are points that are redeemable for cash or goods.

Further, each individual reviewer is rewarded based on the number of points accumulated as compared to the number of points accumulated by other individual reviewers.

Alternately, or in addition to, only those individual reviewers that have accumulated enough points to be amongst a top percentage of individual reviewers are eligible to redeem the points.

BRIEF DESCRIPTION OF THE DRAWINGS

The foregoing and other features of the present invention will be more readily apparent from the following detailed description and drawings of illustrative embodiments of the invention in which.

DETAILED DESCRIPTION OF THE INVENTION

Figure 1:
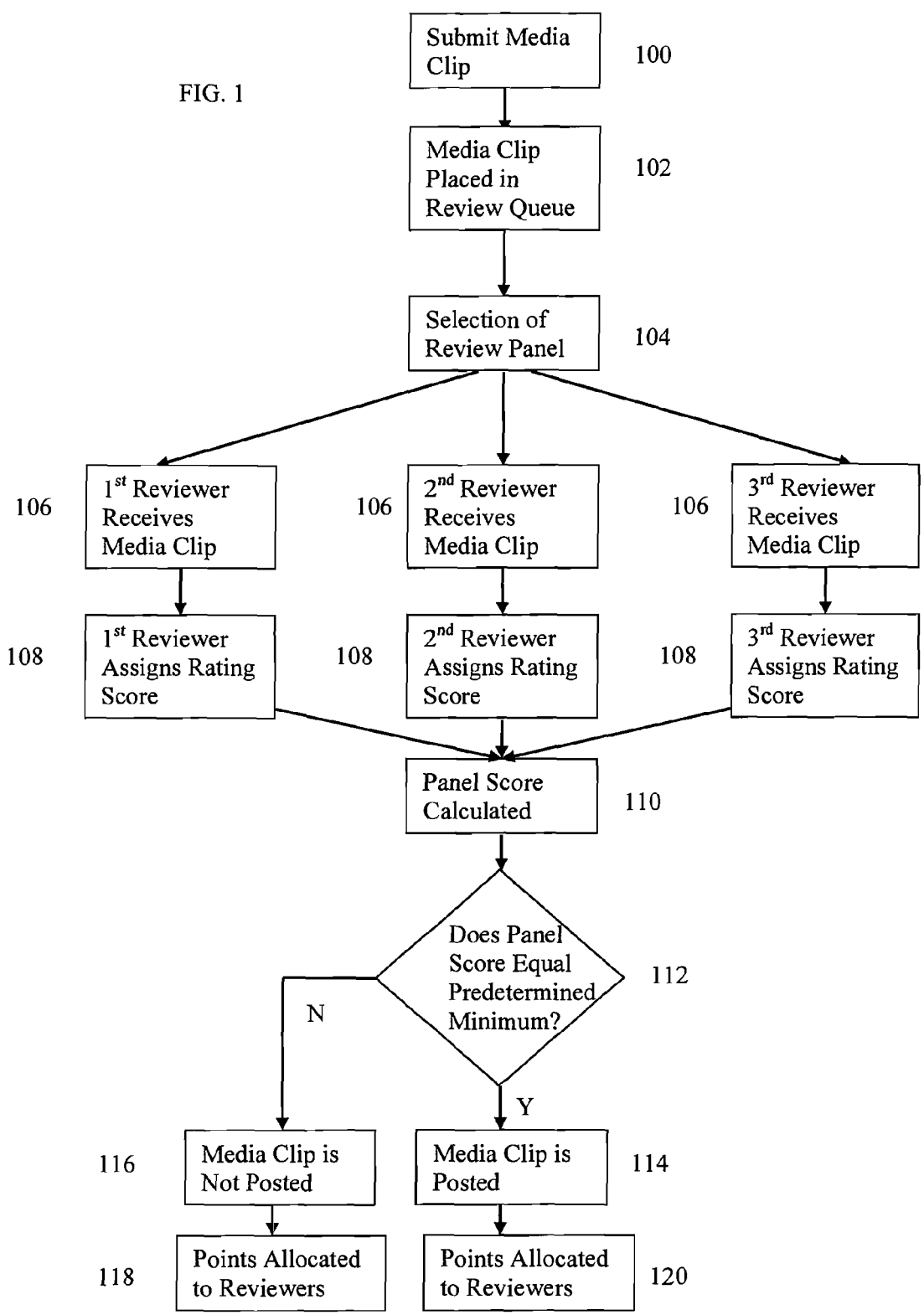
FIG. 1 is flow chart that represents a review process according to an embodiment of the present invention.

A website that rewards users for indirect, unseen activity is disclosed. In one embodiment, the website is one that is used to host media, such as video and movies. Media clips, which can be audio works, short clips, short films, or full length movies, are submitted to be posted on the website. However, before the media clips are posted, they must undergo a review process. This review process is implemented in order to help to ensure that only quality media clips are hosted on the website. Other websites that allow open postings without a review process can become clogged and cluttered with video clips. High quality postings can become buried amongst the numerous poor quality submissions. This detracts from the value of the website. Many visitors to the website will be become frustrated when looking for high quality media because it is difficult to find when it is hosted or featured along with all the low quality media. Therefore, a review or rating selection process is included to prevent low quality media from being hosted or featured on the website.

When a media clip is submitted to be hosted or featured on the website, it must first undergo a review process. The review process is performed by a panel of reviewers. The panel of reviewers consists of more than one reviewer, and in one embodiment it consists of three reviewers. Each reviewer individually reviews the submitted media clip. After the reviewing the clip, the reviewer rates the clip. As an example, a rating system can include a scale from 1 to 10, with 1 being the lowest score and 10 being the highest. If the reviewer found the clip to be of high quality, for example, the reviewer could assign the clip a relatively high score, such as 8.

Once each reviewer in the panel reviews the media clip, the scores assigned by the reviewers are compiled and then averaged. If the average of the scores is above a predetermined threshold score, the media clip is approved for posting. If the average of the scores is below the predetermined threshold score, the clip is rejected and will not be posted on the website.

The website does not necessarily have to host the media clips and be responsible for maintaining the clips on servers. The website can simply function as a "guide" to the best media clips on the Internet. Instead of hosting the approved media clips, the website can feature them by providing the URL links which provide access to approved media clips that are hosted on other sites on the Internet. In this way, media that are stored on a vast number of different sites across the Internet can be accessed through this single website via the links. Only links to approved media clips would be posted on the website.

The panel of reviewers provides a review process where the quality of the clip is not determined by a single reviewer. This prevents a potentially high quality clip from being rejected because of the particular tastes of any one reviewer. Any one reviewer does not have the power to approve or reject a submitted media clip. The rating of a media clip by a reviewer does not have a direct effect on the outcome of whether or not the media clip will be posted on the website. It is only through the collective panel of reviewers that a media clip will be posted on the website. Thus, the activities of the individual reviewer only has an indirect effect on the quality of the website and its postings. Further, the reviewing activities of the reviewers are unseen, because users of the website that use the website to view clips will not be aware of the work that has been performed by the reviewers in rejecting poor quality clips. Users only see the clips that have been approved and are unaware of all those clips that were reviewed and rejected. Thus, the activities of the individual reviewer are unseen and indirect in two respects; i) the individual reviewer's review and rating is not responsible for the appearance of a media clip being posted on the site, the appearance of the clip is the consequence of the judgment of the collective panel of reviewers approving the selection; and ii) those media clips which do not appear on the site because they have been rejected by the collective panel are themselves unknown to anyone except the site managers and the panel. Yet these unseen indirect activities are essential in establishing and maintaining the quality of the website as a whole.

FIG. 1 illustrates an example of how the process of submitting, reviewing, and posting a media clip is carried out.

A creator creates a media clip and/or submits a media clip to the website to be posted on the website (or listed on the website as part of a "guide") so that it can be viewed by others on the Internet (step 100). This role is not limited to creators of original content media clips. Media clips that have been created by others can be submitted for review to be posted or listed on the website as well. For example, a link to a clip that is being hosted on another unaffiliated website can be submitted for review so that a link to the clip can be listed on the website if it receives a favorable review from the selection panel. The media clip is accepted by the website and placed in a queue to be reviewed by a panel of reviewers (step 102).

The panel of reviewers can be selected using a selection module to select a number of individual reviewers (e.g. three reviewers) from a pool of potential reviewers in order to compose the review panel (step 104). The pool of reviewers can consist of reviewers that have applied to the website to become reviewers and have been accepted as reviewers. Another way to select reviewers for the panel of reviewers can be based on their supposed expertise in judging the quality of the submissions. In addition, the pool of reviewers can also include creators that have submitted media clips to the website which have been approved for posting. Once the creator's media clip has been approved and posted, the creator has the option of becoming a reviewer and review media clips submitted by others. Reviewers also have the option to create media clips and submit them for review by another panel of reviewers.

The selection module can select the individual reviewers to form the panel or reviewers based on a number of different factors. The reviewers can be selected randomly so that each individual reviewer has an equal opportunity to review media clips. Another way to select reviewers for the panel of reviewers can be based on the availability of each individual reviewer to review clips. For example, each reviewer can indicate the number of minutes per period of time the reviewer can devote to reviewing (e.g. fifty minutes per week). Then the individual reviewer's eligibility to review a particular movie clip is determined based on their availability and the length of the media clip to be reviewed. As an example, if the media clip is twenty-five minutes long and the availability of a particular reviewer is fifty minutes that week, then the reviewer is eligible to review the clip. If the particular reviewer is selected to review the clip, then their availability to review other clips that week is reduced by the length of the media clip (e.g., reduced to twenty-five minutes). Reviewers may also be selected to a panel based on other parameters, such as genre preferences, age, gender, or other parameters.

Once the panel of reviewers has been selected, each individual reviewer in the panel is notified that they have been assigned to review a particular media clip. The media clip is made available to the reviewer so they can access and view it (step 106). The media clip can be made accessible to the individual reviewer, for example, it can be available online for streamed viewing, for downloading, or emailed to the reviewer. The reviewer can also be given a specific period of time to view and review the particular media clip and complete the reviewing task (e.g. two weeks).

After the reviewer has viewed the clip, the reviewer has to rate the quality of the clip (step 108). This can be done by assigning the media clip a numerical score (e.g. between 1-10), a star rating, or a letter grade system. The reviewer can either email the score of the media clip or the clip can be scored online. The reviewer can assign a single score to the clip based on its overall quality or the reviewer can review the clip based on a number of separate parameters. In one embodiment, the submitted clip could be scored on three separate parameters (on a 1 to 10 scale); the first being "execution, production, craft"; the second being "originality, creativity, imagination"; and the third being "the likelihood that you would recommend this film to others."

The individual reviewer's score for the media clip is then accepted to be compiled with the scores of the other reviewers that compose the panel of reviewers. Once all the scores from all the reviewers in the panel have been received, the individual scores are compiled to determine if the media clip has received a high enough score from the panel of reviewers to be accepted onto the website where it can be viewed by others (step 110). The scores of the individual reviewers can be averaged or simply taken as an aggregate. The compiled score is then compared to the predetermined threshold score that is required for a media clip to reach before it is posted (step 112). If the compiled score is high enough, the clip will be posted (step 114). If the score is not high enough, the clip will be rejected and will not be posted for viewing by others (step 116). Further, the reviewers will be allotted points for reviewing the clip regardless of whether or not it is posted (steps 118 and 120).

In addition there can be a review or rating process by which the high quality media which are posted on the website can be further rated according to the collective judgment of all reviewers and not just the selection panel. An individual reviewer has the option to review clips that have already been reviewed, approved, and posted on the website by the initial panel of reviewers. Thus, each individual reviewer has the option to review every media clip which has been posted on the site once, and as a consequence the rating on the site is the consequence of more than just the selection panel. For example, after the compiled score from the panel of reviewers has been determined and the media clip has received a score high enough to be posted or featured on the website (e.g. 6 out of 10 or better), the entire collectivity of reviewers or a selected portion of the collectivity may be invited to score (once) each of the media clips that are posted or featured on the website. The scoring system might be identical to that of the initial panel of reviewers (e.g. a rating system of 1 to 10) or the score might be restricted to a range which goes from the threshold for selection (e.g. 6) up to the highest (e.g. 10). By this means the rating that was assigned by the panel of reviewers can be viewable by users of the website, or the rating that is assigned by the collectivity of reviewers after the media clip has already been posted on the website can be viewable by users of the website. The latter permits users to see which media clips are judged to be of exceptionally high quality based on high scores compiled from all the reviewers rather than just three.

In order to encourage reviewers to review media clips, incentive is provided to reviewers to engage in these unseen indirect activities. The incentive could be cash or goods or other benefits.

Figure 3:
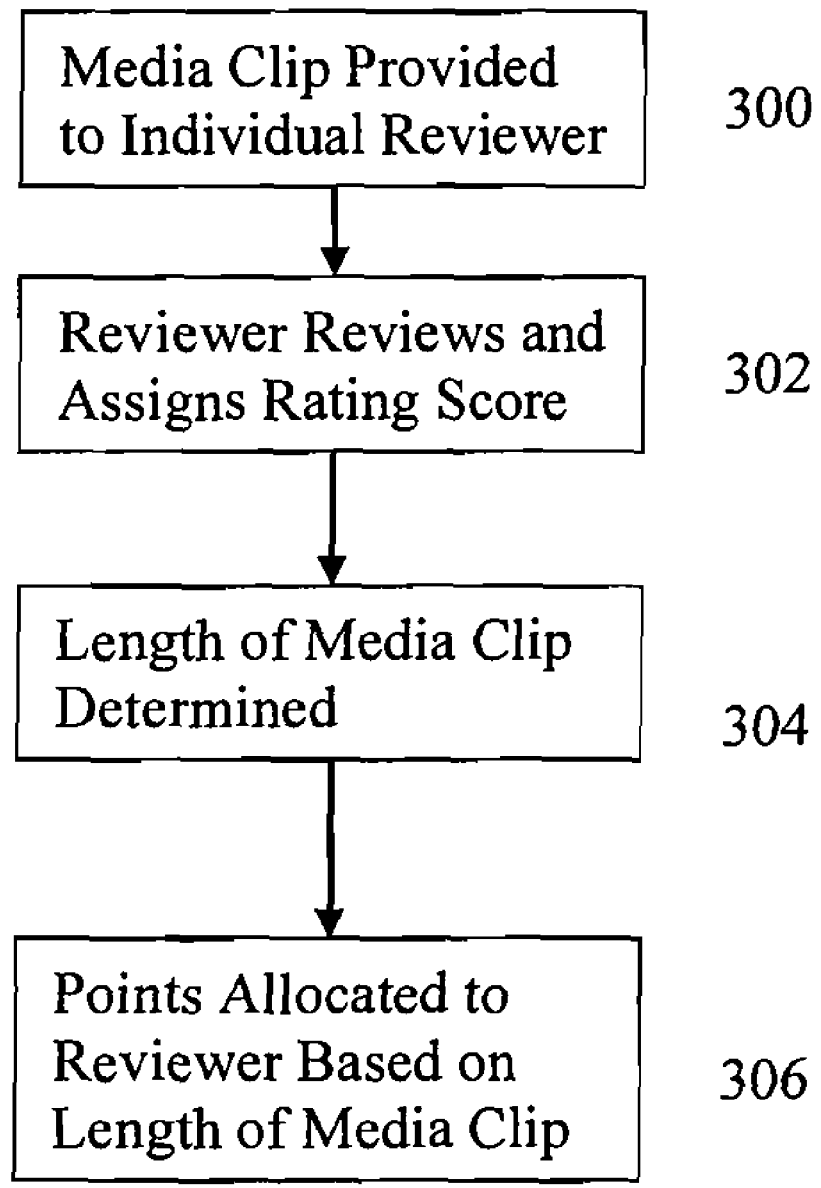
FIG. 3 is a flow chart that represents an allotment of points according to an embodiment of the invention.

In addition the incentive could be through the acquisition of points which can subsequently be converted to material benefit. The reviewers are assigned points based on the reviewing of media clips. The points can be allocated based on a number of formulas and parameters. For example, a reviewer can be allocated points based on the length of time the reviewer dedicates to reviewing clips. If a media clip is 100 minutes long, the reviewer can be given one point for each minute of clip reviewed, for example. The greater the length of each clip and the more clips they review results in a higher number of points. FIG. 3 represents a process of showing a reviewer that is allotted points based on the length of the media clip reviewed. The reviewer is assigned a media clip to review (step 300). The reviewer reviews and assigns a rating score to the media clip (step 302). The length of the media clip can be automatically determined (step 304). In determining the length of the media clip, for point allocation purposes, the length of the clip may be "rounded" either "up" or "down" to the nearest second, minute, 10 minutes, 15 minutes, half hour, or hour, depending on how the points are allotted. The reviewer is allotted points based on the length of the media clip that was reviewed (step 306), the longer the clip the more points the reviewers are allocated. Thus, if points are allocated for each minute of reviewed clip, a 30 second short, may count as 1 minute for point allocation. Conversely, a 2 minute and 10 second clip may only count as a 2 minute clip. However, to be fair to the reviewers, a better practice is to "round up" all time to the next point allocation increment.

Reviewers can also be rewarded based on the number of clips they review. They can get 100 points for each clip they reviewed, regardless of its length. They can also be rewarded a set amount for each clip they review, plus a number of points based on the length of each clip. Thus, over the course of time, depending on how active the reviewer is, the reviewer can accumulate a number of points.

Figure 2:
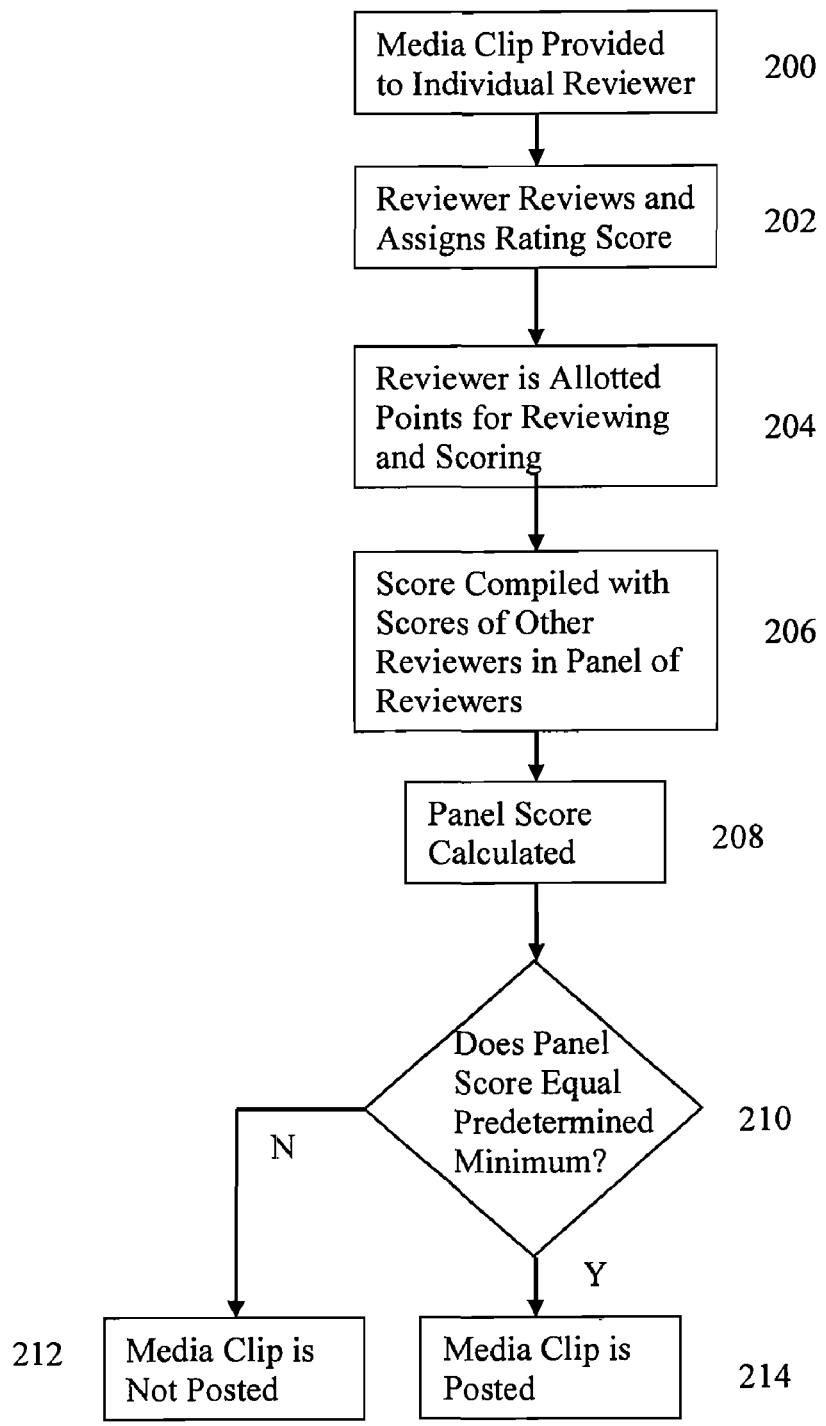
FIG. 2 is a flow chart that represents a review process and allotment of points according to an embodiment of the invention.

FIG. 2 illustrates the process of reviewing and receiving points for reviewing. The individual reviewer that is a part of the selected panel of reviewers receives the media clip to review (step 200). The reviewer then views the clip and assigns the clip a score (step 202). Once the reviewer submits the score, the reviewer is allotted points for the reviewing (step 204). The reviewer is allotted the points regardless of the score the individual reviewer assigned the media clip and regardless of whether the media clip is posted (step 214) or not posted (step 212) to the website as a result of the score received from the panel of reviewers (steps 206-210). The individual reviewer will receive points for the review even if the score they assign is contrary to the scores assigned by the other reviewers in the panel of reviewers. For example, if the individual reviewer assigned the particular media clip a low score with the intent that it not be posted on the website and the other reviewers in the panel assigned the clip a high score and the clip was posted on the website because the average score of the panel of reviewers was high enough, the individual reviewer that voted against the clip (and was "overruled") will still be allotted points for reviewing the clip. Individual reviewers will also be allotted points when their review scores, combined with the review scores of the other reviewers in the panel or reviewers, results in the non-appearance of a media clip on the website. Thus, the reviewers will still be allotted points for their reviewing activities that are unseen by users of the website because the rejected clips never make it onto the website.

The points may have a determined conversion rate into cash or goods or other benefits. Alternately, the points may not directly translate into a reward value for the reviewer. The points can have no set value. The reviewers are rewarded, if at all, based on the number of points accumulated and on the success of the website as a whole in generating profit. The reviewers review media clips to determine if they are of high enough quality to be posted on the website. However, the scores they assign only indirectly affect whether or not the clip will be posted. This is because their score alone has no determinative value, it is only the score of the panel of reviewers that determines whether the clip will be posted. However, the individual reviewer has an incentive to ensure that only high quality clips will be posted on the site, which provides incentive for the reviewers to review with honesty and integrity. By ensuring that only high quality clips get posted to the website, the value of the website as whole will be increased. If the website is known to only have high quality clips, the website will be valued by users of the website that wish to view quality clips. By keeping low quality clips off the website through the panel of reviewers, each individual reviewer indirectly affects the value of the website. As the value of the website increases and the user base grows and becomes loyal, revenue can be generated through the use of advertising on the website.

Advertisers pay to place advertisements on the website. The more users that use the website and the more loyal the users are to the site, the more advertisers are attracted to website to place their advertisements. Thus, more advertising dollars can be collected from advertisers, which increase the profitability of the website.

The profit of the website can be determined from revenue collected from all sources, for example, advertising revenue. Other sources of revenue may include fees collected from creators to submit their media clips, fees from users to have access to view the clips on the website, or fees collected from users to download particular clips from the website. After all expenses and costs for operating the website are accounted for, the profit of the website can be determined. This can be determined on a yearly operating basis for the website.

The reviewers can then be rewarded, if at all, from the profit of the website. If after expenses, it is determined that there was no profit for the website in a particular year, the reviewers are not compensated for the points accrued for the reviewing of media clips in that year. The points accrued can be rolled forward into the following year and if there are profits in the following year the reviewers may then get rewarded.

If there are profits available in the current year, directors of the website can determine what percentage of the profits are available for distribution to reviewers that have accrued points and determine how the profits are to be allocated based on the points accrued. For example, the directors could determine that twenty-percent of the profits are to be allocated for distribution to the reviewers and that only the top ten percent of reviewers based on points allocated are to be rewarded (i.e., the reviewers that accrued the most points to place them in the top ten percent compared to the rest of the reviewers). This model of distribution provides larger dollar amounts to a smaller number of reviewers, which may strategically make the incentives for reviewing media clips appear greater. Reviewers that have collected points, but have not accrued enough to be considered for a dollar distribution, can roll their points over into the following year. Also, reviewers who are eligible for a dollar distribution (e.g. in the top ten percent) may choose not to have a distribution in the present year. The reviewer can attempt to anticipate that profits in the following year will be greater, and defer their distribution in the current year until the following year in the hopes that profits are greater and therefore their distribution would be greater.

The directors could also distribute the profits to all reviewers, which can be allocated based on the number of points accrued by each reviewer. This way all reviewers that have collected points will be rewarded, with reviewers that have collected the most points getting a larger reward.

This system ensures that the website will not go bankrupt as a consequence of excess monetary rewards offered before the annual profit and loss is calculated because rewards will only be distributed based on real profits. Also, the directors may choose not to make a distribution, even if there are profits in a particular year, if the directors determine that all the profits should be used for other purposes, such as reinvesting the money into the website for improvements or other purposes.

In this way, reviewers are rewarded for their unseen, indirect activities. The activities are unseen because the users of the website do not see the work that was performed to reject poor clips. The activities are indirect, because no one individual reviewer has control over whether quality clips are posted to the website in order to improve the quality of the website as a whole nor on the overall ranking of those quality clips once they have been posted. However, it is this unseen, indirect activity that increases the value of the website, which generates more revenue and profits for the website, which in turn, determines how much the reviewers will be rewarded. Thus, a system for rewarding members of a website for their unseen, indirect activities is disclosed.

In addition to reviewers, creators of media clips may also be allotted points and therefore become eligible to share in the distribution of profit. Creators or submitters can be awarded points based on the number of clips they submit that are approved by a review panel, the length of the clips submitted and approved, the quality of the clips submitted and approved based on the score the clips receive from the review panel, for example.

In another embodiment, the governance of the website and business entity running website, collecting revenue, and distributing profits can have a structure that is in some ways similar to a corporate structure. A "governing entity" may be formed to benefit the interests of the company (which runs the website) as well as the individual members who contribute to the value of the website through their unseen indirect activities. The individual members, who can include creators that submit and have media clips approved as well as reviewers that review and approve media clips, are like shareholders.

The governing entity may be constituted to centralize the participation of the members so as to ensure that individual members participate in the governance only via the governing entity. This is beneficial because the membership is potentially composed of tens of thousands of individual members and is fluid and changing, whereas the governing entity needs to be fixed and certain and of a structure capable of efficient governance. The governing entity might be the board of directors if the corporation is used to run the business and website. The board of directors would be act to further the interests of the members since the interests of the members coincide with the interests of the company, by determining the amount and method of distribution of profits to the individual members.

Each individual member has a stake in the success of the website because if the website is profitable, the member has a stake in a percentage of those profits as determined by the governing entity. However, each individual member does not have an equal stake. A member's stake can be increased based principally on the value of their unseen indirect activity on the site. A member's stake can be turned into cash or some other benefit, as determined by the distribution amount and method determined by the governing entity.

Alternatively, the governing entity can function as a trust vehicle for the members. A portion of the profits, if any, can be provided by the company to the governing entity to be held in trust for the individual members. Then the governing entity will distribute the benefit to the individual members. The governing entity can determine the method of distribution such that individual members receive a share proportionate to their unseen indirect activity. The method of distribution may also be established by "membership rules" that are in force. The rules, among other things, publish the method of distribution. As a modification to the trust scheme, another option is to provide "shadow equity," which is not real equity in the company but entitles the individual members to a stake in the profits. The share in the stake for an individual member being proportionate to their unseen indirect activity.

While the invention has been particularly shown and described with reference to preferred embodiments thereof, it will be understood by those skilled in the art that various changes in form and details may be made therein without departing from the spirit and scope of the invention.

The invention claimed is:

1. A method for maintaining a website by providing rewards for indirect unseen activities, comprising:
    forming a panel of reviewers that includes at least two individual reviewers;
    providing an article of media to each of the individual reviewers of the panel of reviewers, wherein each individual reviewer reviews and assigns a rating score to the article of media;
    compiling the rating scores, using a processor, from each individual reviewer and determining a panel score based on the rating scores from each individual reviewer;
    comparing via the processor the panel score against a predetermined minimum score to determine whether the article of media will be accepted and viewable or rejected and not viewable;
    rewarding each individual reviewer with a reward for reviewing and assigning a rating score to the article of media regardless of how the individual reviewer's score compares to the scores of other individual reviewers or the panel score, and regardless of whether the article media will be accepted and viewable or rejected and not viewable.

2. The method of claim 1, wherein the website is capable of generating revenue and further comprising the step of valuing the rewards based on a profitability of the website.

3. The method of claim 2, further comprising the step of distributing the rewards on a yearly basis based on the year end profitability of the website.

4. The method of claim 2, wherein the rewards are points that are redeemable for cash or goods.

5. The method of claim 4, further comprising the step of compensating each individual reviewer based on the number of points accumulated as compared to the number of points accumulated by other individual reviewers.

6. The method of claim 4, further comprising the step of redeeming the points of only those individual reviewers that have accumulated enough points to be amongst a top percentage of individual reviewers.

7. The method of claim 1, further comprising the step of increasing the number of rewards rewarded to each individual reviewer as the number of articles of media each individual reviewer reviews and assigns a rating score increases.

8. The method of claim 1, further comprising the step of increasing the number of rewards rewarded to each individual reviewer as the length of the articles of media each individual reviewer reviews and assigns a rating score increases.

9. The method of claim 1, wherein the rewarding step further comprises the steps of:
  determining a length of the article of media;
  rounding the length of the article of media to a point length of the article of media; and
  assigning each individual reviewer points based on the point length of the article of media.

10. A method for maintaining a website by providing rewards for indirect unseen activities, comprising the steps of:
  forming a panel of reviewers that includes at least two individual reviewers;
  providing an article of media to each of the individual reviewers of the panel of reviewers, wherein each individual reviewer reviews and assigns a rating score to the article of media;
  compiling the rating scores, using a processor, from each individual reviewer and determining a panel score based on the rating scores from each individual reviewer;
  comparing via the processor the panel score against a predetermined minimum score to determine whether the article of media will be accepted and viewable or rejected and not viewable;
  rewarding each individual reviewer with a reward for reviewing and assigning a rating score to the article of media regardless of how the individual reviewer's score compares to the scores of other individual reviewers or the panel score, and regardless of whether the article media will be accepted and viewable or rejected and not viewable; and
  compensating each individual reviewer based on the number of points accumulated as compared to the number of points accumulated by other individual reviewers,
  wherein the compensating of each individual reviewer occurs only if the respective individual reviewer is amongst a predetermined top percentage of the other individual reviewers based on the respective number of points accumulated.

11. The method of claim 10, wherein the website is capable of generating revenue and further comprising valuing the rewards based on a profitability of the website.

12. The method of claim 11, wherein the rewards are points that are redeemable for cash or goods.

13. The method of claim 10, wherein the website provides at least one link to at least one approved article of media.

14. The method of claim 10, wherein the forming of the panel of reviewers involves selecting reviewers on the basis of at least one of: random selection; genre preference; age; gender; and other preferences.

15. The method of claim 10, wherein the forming of the panel of reviewers involves selecting creators whose submitted article of media has been approved.

16. The method of claim 10, wherein the forming of the panel of reviewers involves selecting at least one reviewer based on a period of time that the reviewer can devote to reviewing.

17. The method of claim 10, wherein the rewarding step further comprises the steps of:
  determining a length of the article of media;
  rounding the length of the article of media to a point length of the article of media; and
  assigning each individual reviewer points based on the point length of the article of media.

* * * * *